(12) United States Patent
Amacker

(10) Patent No.: US 9,087,395 B1
(45) Date of Patent: Jul. 21, 2015

(54) TECHNIQUES FOR PROVIDING CONTENT ANIMATION

(75) Inventor: Matthew W. Amacker, Santa Clara, CA (US)

(73) Assignee: A9.com, Inc., Palo Alto, CA (US)

( * ) Notice: Subject to any disclaimer, the term of this patent is extended or adjusted under 35 U.S.C. 154(b) by 951 days.

(21) Appl. No.: 13/096,825

(22) Filed: Apr. 28, 2011

(51) Int. Cl.
G06T 13/00 (2011.01)

(52) U.S. Cl.
CPC ..................... *G06T 13/00* (2013.01)

(58) Field of Classification Search
None
See application file for complete search history.

(56) References Cited

U.S. PATENT DOCUMENTS

| | | | |
|---|---|---|---|
| 7,079,158 B2 * | 7/2006 | Lambertsen | 345/630 |
| 7,143,100 B2 * | 11/2006 | Carlson et al. | 1/1 |
| 7,184,047 B1 * | 2/2007 | Crampton | 345/473 |
| 7,242,999 B2 * | 7/2007 | Wang | 700/132 |
| 7,246,085 B2 * | 7/2007 | Kamon et al. | 705/27.2 |
| 7,346,421 B2 * | 3/2008 | Bijvoet | 700/132 |
| 7,657,341 B2 * | 2/2010 | Lind | 700/141 |
| 2001/0026272 A1 * | 10/2001 | Feld et al. | 345/419 |

* cited by examiner

*Primary Examiner* — Said Broome
(74) *Attorney, Agent, or Firm* — Hogan Lovells US LLP

(57) ABSTRACT

Techniques for enabling content animation in substantially real time are disclosed. In one embodiment, a method for content animation in substantially real time includes providing content for display including at least one image, detecting an interaction of a user with respect to the at least one image, determining a boundary within the image comprising a contour of an object represented in the at least one image, applying a set of movement constraints to the object within the determined boundary, and enabling animation of a portion of the at least one image corresponding to the object in the displayed content based at least in part upon the applied movement constraints. The animation may occur in response to a user selecting a portion of the object and moving the object within the selected image.

17 Claims, 15 Drawing Sheets

TECHNIQUES FOR PROVIDING CONTENT ANIMATION

BACKGROUND

Entities having a presence in an electronic environment, such as may be provided via a Web site or other such source of content, often take advantage of the full capabilities of modern Web-based services to deliver a compelling user experience. For example, an Internet user may access network resources such as Web sites offering items, products, or services for sale. Usually, these Web sites contain many different types of content, including images of items offered for sale that are often grouped by product categories, prices, and the like. Many Web sites provide enhancements enabling a user to view images of items offered for sale, for example, in a zoomed view of three-dimensional (3D) format. Sometimes, items might be associated with multiple images that enable the item to be viewed on a Web site from different viewpoints and/or angles.

However, items viewed on a Web site are typically represented by still images, albeit in different formats, shapes, or forms. Meanwhile, a user may desire additional or different types of information about a viewed item, for example an item of clothing offered for sale on a Web site. Due to the nature of the still images of the item, a user is not able to get a sense for the feel of the item's fabric, texture, softness, or flexibility. As a result, a user may end up purchasing an article of clothing that may not fit well, may not be comfortable to wear, or otherwise may not satisfy the user from the fabric standpoint. Accordingly, that may leave the user frustrated or at least somewhat dissatisfied with his or her experience with the Web site.

DETAILED DESCRIPTION

Figure 1:
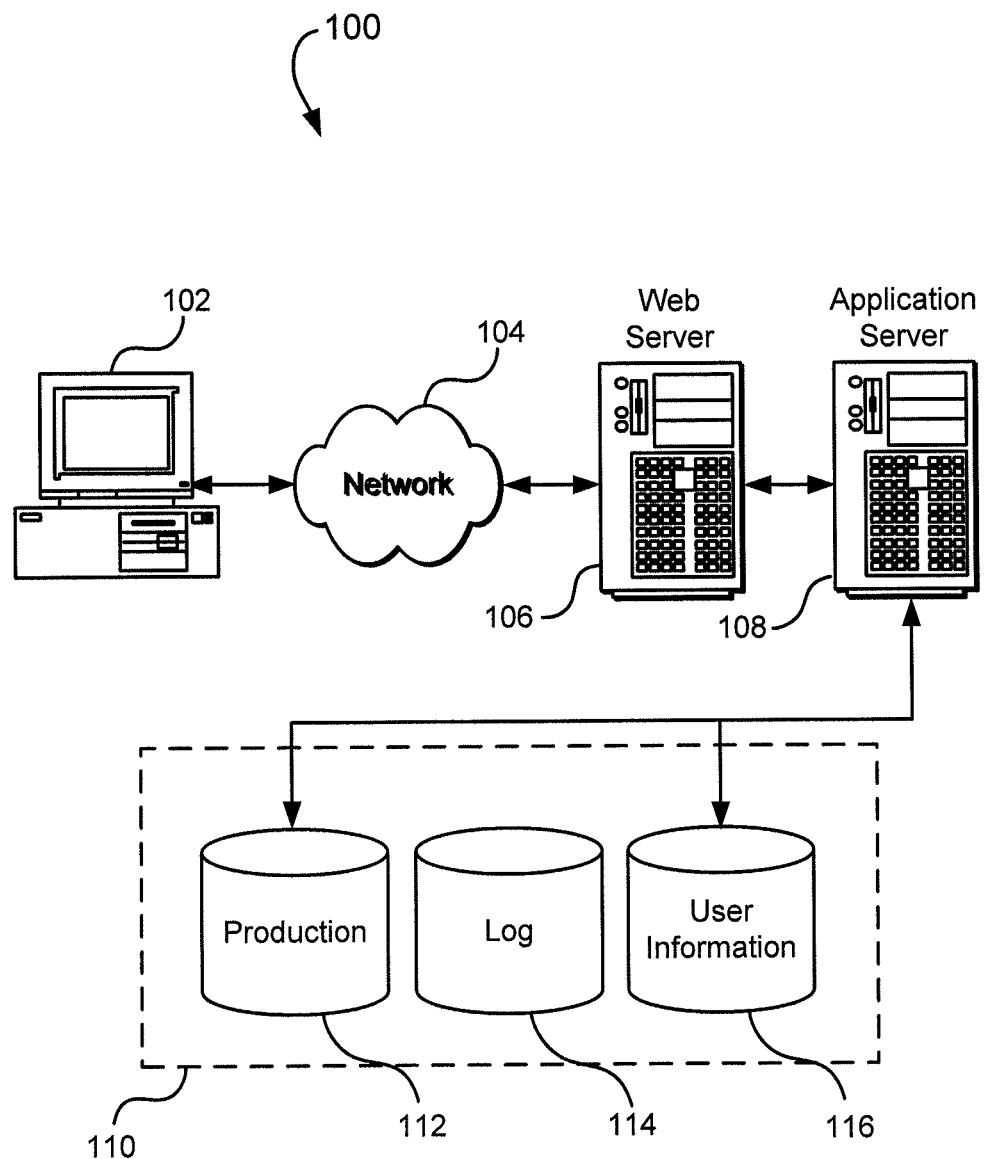
FIG. 1 illustrates an environment in which various embodiments can be implemented.

Techniques are presented for providing content animation, as may be created for a user in substantially real time based on the user's activity with respect to certain content. In a network-based environment (e.g., based upon the Internet), a user may conduct various types of activities, for example, may view products offered for sale or search for any item of interest (e.g., an image, a product, video or audio content, and the like) on a network resource using one or more search services, such as at least one network search engine. A network resource may include a collection of content such as a Web site or electronic marketplace that can be accessed through a client browser or other such interface and displayed on a display element of a computing device. A network resource visited by a user may contain information for one or more items (e.g., products or services) that the user has located, such as through browsing or search. Based on a user selection of an item of content to view, or independently of user selection, an image of the item on the network resource may be animation-enabled in substantially real time in order to "tailor" the content to user's current interests and make user experience with the network resource more personal, efficient, and compelling.

In accordance with an embodiment, a user, while interacting with rendered content, may access (e.g., select) selectable content elements provided with the content. A selectable content element can include any graphical, virtual, or physical element that can be selected, entered, activated, or otherwise indicated by a user through a device. For example, a user may select a still image of an item or object, e.g., a user may select an image of a watch, a shirt, a pant, a coat, or the like on an electronic marketplace such as a Web site. A trusted script loaded on a user's browser may apply an animation technique to the selected image and make the image moveable (animated) by the user in substantially real time. In another example, the trusted script may enable animation of some or all images of objects on a page of content presented to a user in advance of the user selection of an image.

In an embodiment, an animation technique realized by the trusted script is applied as follows. An image of an object on a background is converted into a browser-changeable picture object, such as, for example, the image may be described in terms of HTML 5® Canvas® elements. As known to those skilled in the art, a Canvas® element consists of a drawable region defined in HTML® code with height and width attributes. Image attributes, such as color, opacity, and the like may be controlled on a pixel-by-pixel basis. A trusted script executed on a browser, such as JavaScript® code, may access the image and scan a plurality of pixel rows comprising the image. Accordingly, pixel data may be extracted from the image.

In an embodiment, the trusted script may screen the image pixel by pixel in order to determine and record transition points from a background portion of the image (e.g., white or other dominant-color pixels surrounding an object of interest) and a portion of the image corresponding to the object of interest (e.g., non-white or other non-dominant color pixels). One or more boundaries of the object of interest in the image thus can be determined automatically. The pixels representing the background then can be effectively removed, or made transparent, such that the image primarily includes the object of interest in a visible layer. A structure (referred to hereinafter as a fabric model) then can be generated within the determined boundaries of the image that enables animation of the object portion of the image. In an embodiment, the structure may be built using a series of triangulations and may comprise a set of segments (bounding boxes), for example, geometrical figures, e.g., triangles, squares, circles, and the like. The granularity of the image, i.e., the number of the geometrical figures comprising the generated structure may vary and ultimately may be limited by a processor capacity of a computing device on which the process is executed.

In an embodiment, the background removal and/or other portions of the image may be done in advance on the back end. Similarly, the fabric model may be determined on the back end as well. Then, the determined data may be provided to a trusted script (e.g., JavaScript®) which will render the image on the content resource (e.g., Web page).

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, and the environment includes a Web server 106 for receiving requests and serving content in response thereto, although for other networks, an alternative device serving a similar purpose could be used, as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein, the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to a viewer, which may be served to the viewer by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing log data 114, which can be used for reporting, generating statistics, and other such purposes. It should be understood that there can be many other aspects that may need to be stored in the data store, such as for page image information and access right information, which can be stored in any of the above-listed mechanisms as appropriate or in additional mechanisms in the data store 110. The data store 110 is operable, through logic associated therewith, to receive instructions from the application server 108 and obtain, update, or otherwise process data in response thereto. In one example, a viewer might submit a search request for a certain type of item. In this case, the data store might access the user information to verify the identity of the viewer, and can access the catalog detail information to obtain information about items of that type. The information then can be returned to the viewer, such as in a results listing on a Web page that the viewer is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limited to the scope of the disclosure.

Figure 2:
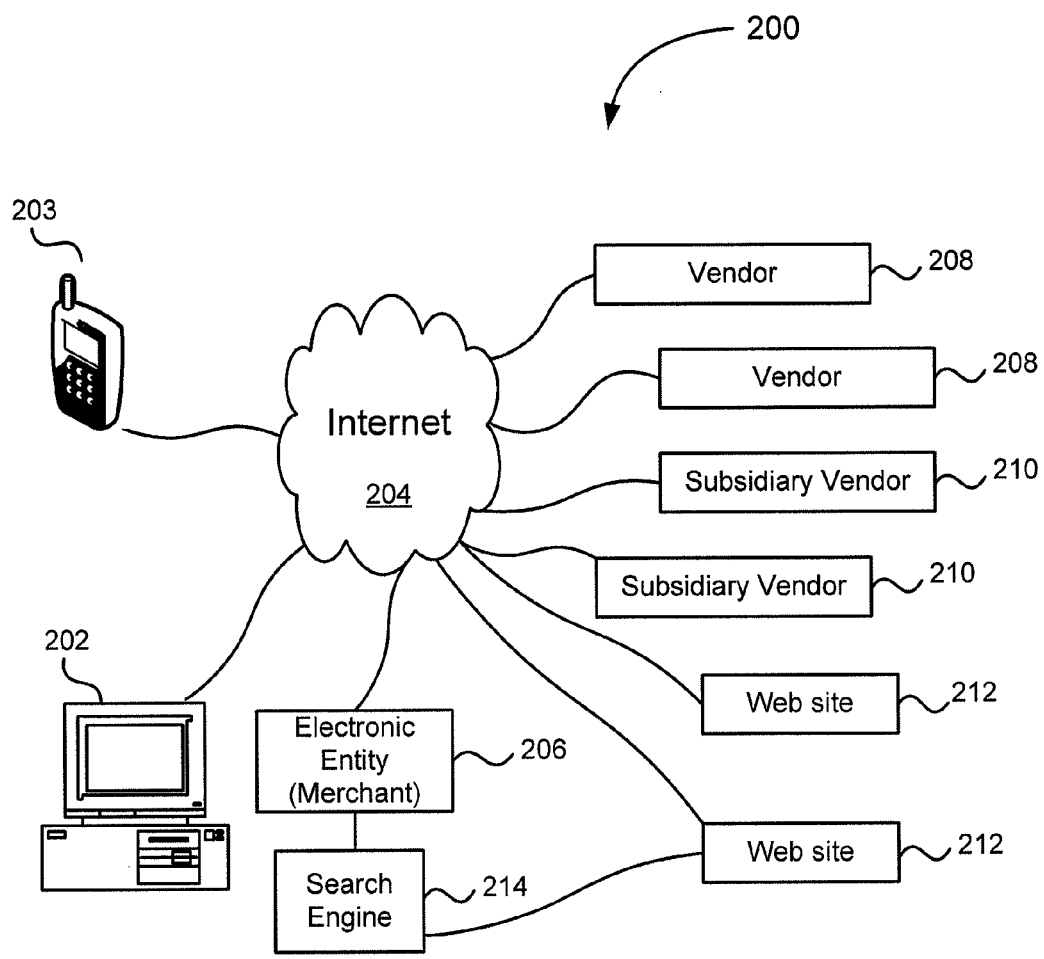
FIG. 2 illustrates an environment in which various embodiments may be practiced.

FIG. 2 shows an example environment 200 in which various embodiments may be practiced. The environment 200 may be realized utilizing one or more of the components of the environment described above in connection with FIG. 1. The environment 200, in an embodiment, includes a plurality of users operating client computing devices 202 and 203 that utilize a network such as the Internet 204 to browse content of various content providers. While the environment 200 shows the client computing devices 202 utilizing the Internet, it should be understood that other networks may be used as an alternative to or in addition to the Internet 204. Examples of other networks include mobile networks, intranets, and generally any suitable communications network. Likewise, it should be understood that client computing devices 202 and 203 may include personal computers, cell phones, handheld messaging devices, laptop computers, set-top boxes, personal data assistants, electronic book readers, and the like.

In an embodiment, users may interact through devices 202 and 203 with other entities in order to consume content, search for information or items for consumption, purchase items for consumption, and the like. As used herein, an item for consumption includes any product or item which may be consumed by a consumer. Examples include tangible items, such as consumer products. Examples also include electronic items which may be downloaded and/or streamed, including audio files, video files, and other digital content. Examples of items for consumption also include services which may be performed for and/or on behalf of consumers. As shown in FIG. 2, the environment 200 includes an electronic entity, or merchant 206. The merchant 206, for example, may operate an electronic marketplace such that the users may search, via devices 202 or 203 utilizing search services (e.g., a Web search engine 214), for items for consumption offered by the merchant 206. The merchant 206 may offer items for consumption that come from various sources, including the merchant's own sources. For example, the merchant 206 may operate systems, such as those described above in connection with FIG. 1, that enable others to utilize the systems to offer items for consumption. In short, the merchant 206 may facilitate user search and consumption of items or products offered by the merchant 206 and/or vendors 208 and/or 210, as well as creating wishlists of items by the users of devices 202 or 203.

In an embodiment, the environment 200 includes one or more affiliate or third-party vendors 208. In an embodiment, an affiliate vendor is a merchant who offers for consumption items that are actually consumed by consumers from the merchant 206. Affiliate vendors 208 may cooperate with the merchant 206 in various ways. In one embodiment, the merchant 206 may operate an electronic marketplace, such as a Web site 212 and advertise and/or sell items for consumption that are offered by the affiliate vendor 208. Affiliate vendors 208 may utilize various systems provided by the merchant 206, such as electronic search services that enable users to search for items for consumption, and other systems.

The environment 200 may include one or more subsidiary vendors 210. In an embodiment, a subsidiary vendor is a merchant whose operations may be controlled, either completely or partially, by the merchant 206. For example, a subsidiary vendor 210 may be operated by the merchant 206, but may offer items for consumption under a brand different from the merchant 206. The subsidiary vendor 210 may offer the same products or products for consumption different from the merchant 206. Alternatively, the subsidiary vendor 210 may be operated by the affiliate vendor 208, but may offer items for consumption under a brand different from that of the affiliate vendor 208, which may be advertised and/or offered for sale by the affiliate vendor 208 on the merchant 206's Web site 212.

In an embodiment, the environment 200 includes components and instructions for generating one or more Web sites 212. One or more of the Web sites 212 may be operated by the merchant 206, although they need not be. The Web sites 212 may offer various types of content, such as news, video, shopping for products, and the like. The Web sites 212 may offer other services, such as content or product search services, audio, social networking services, and the like. While the example environment 200 shows Web sites for the purpose of illustration, it should be understood that any type of content provider may be included in the environment 200 or variations thereof. For example, content may be provided in various ways, such as through an application interface or through other mechanisms that may not be properly classified as Web sites.

As noted, in an embodiment, the users may interact with content from the various entities, such as by searching products offered by the entities, viewing content from the entities, consuming items from the entities, and the like. In order to search for items or other content provided by the entities, the users may utilize a search service, e.g., the Web search engine 214. As one skilled in the art will appreciate, a Web search engine may be a software or a combination of software and hardware designed to search for information on the Internet. The search engine may be rendered to a client device 202 via a particular Web site or Web sites, such as the Web sites 212. The Web search engine 214 may be affiliated with the merchant 206 in a number of different ways, such as, for example, it may be designed and/or owned by the merchant 206, operated by the merchant 206, contracted by the merchant 206, be independent or autonomous from the merchant 206, and the like. The content of the Web site 212 may be modified based on the user activity as will be described below in greater detail.

Figure 3:
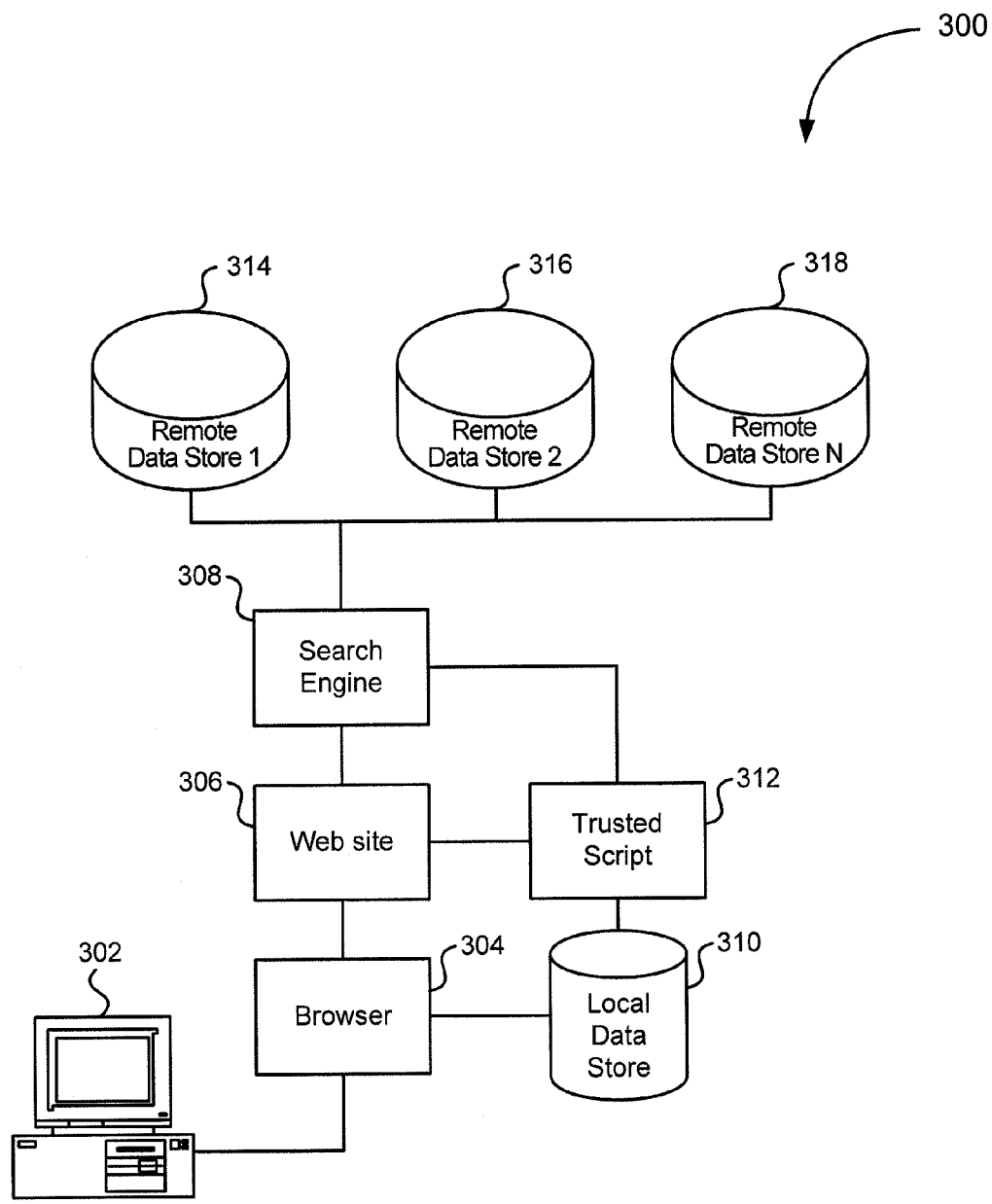
FIG. 3 illustrates a diagrammatic representation of an environment which may incorporate one or more components that are described above in connection with FIGS. 1 and 2 and that may be used in accordance with various embodiments.

FIG. 3 shows an illustrative environment 300 that an electronic entity such as the merchant 206 may utilize in order to provide a user with an ability to repeatedly search for product items or other content offered by the merchant 206 and/or vendors 208 and 210 such that the user can keep track of already-viewed products or content. The environment 300 may be implemented to increase search efficiency for the users utilizing one or more client devices 202 or 203 and thus increase effectiveness for one or more of the entities 206, 208, and/or 210 shown in FIG. 2. In an embodiment, the environment 300 of FIG. 3 is utilized by an electronic entity (such as the merchant 206 shown in FIG. 2) to provide improved search experience to a user using a search service described herein. It is to be understood that the search service may comprise a number of various implementations, including, but not limited to, a software application component executed on a computing device, such as one or more Web servers. In one embodiment, the service may be offered as a part of remote computing services that together make up a cloud computing platform, offered over the Internet. The service may be configured to run in a Web server environment, such as a pure Java HTTP Web server environment.

In an embodiment, the environment 300 includes a client computing device 302 utilized by a user for interaction with electronic entities that provide content. Content may be accessed by a user operating the device 302 through a browser 304. For example, content may include products or items of various types that are to be placed on a Web site 306. The content may be stored in the remote content data store(s) 314, 316, and 318 and may be utilized by merchants, Web sites, or other entities in order to provide users an opportunity to search for, and view, items for consumption and/or other content. In an embodiment, the content data stores 314-318 store content to be provided to users, such as when users request the content by navigating to a Web site 306 operated by a merchant (e.g., merchant 206 on FIG. 2). The Web site 306 may utilize a search engine 308 in order to provide a user with the ability to search for products offered by the merchant 206 or other entities. It will be appreciated that the content may be stored in one or more data stores and that three data stores 314, 316, and 318 are shown for purely illustrative purposes, such that the number of data stores is not limited to three or any other number. The term "remote" used in conjunction with the term "data store" simply means that the data stores 314, 316, or 318 are not placed in an application operating on the computing device 302 or in the computing device itself. The remote data stores may be accessible with the search engine 308 through the Internet or any other type of computer network known in the art. The remote data stores may be associated with the electronic entity, such as above-noted merchant 206. For example, the remote data stores may be associated with a server serving the Web site 306 operated by the merchant 206.

In an embodiment, a trusted script 312, implemented in one embodiment as a JavaScript® and operating on the Web site 306 that is loaded by the browser 304, is configured to enable animation in substantially real time of items viewed by a user while searching items provided by the content data stores 314-318. In some embodiments, the trusted script may also be implemented as ActionScript®, VBScript®, Java Servlet®, Flash®, JScript® or other scripting languages. Specifically, the trusted script 312, in an embodiment, when executed, may separate an image of an item of interest from the background, create an animation-enabling structure (fabric model) for the image of an item, provide animation of an item when the image is selected by a user, and the like. Information associated with user activity on the Web site and with created fabric models of images of items may be stored in a local data store 310. The trusted script 312 may be loaded on a page of the Web site 304 when a user accesses the Web site. In another embodiment, the trusted script may be implemented and is an extension (i.e., a plug-in application) to the browser. In general, the trusted script 312 does not have to be Web site-specific; the script may be provided as a part of a browser or be installed as an extension to a browser.

The local data store 310 may be implemented in a number of different ways. For example, in an embodiment, the data store 308 may comprise a dedicated database accessible by the trusted script 312. In some Web environments, such as, for example, one provided by the HyperText Markup Language (HTML) 50, the local data store 310 may be allocated within a Web site or within a domain. For example, the local data store 310 may be embedded in the pages of the Web site 306 and may be shared with any page visited by the user on that Web site. Thus, the trusted script 312 may communicate with the local data store 310 within the browser 304 that displays the Web site 306 to a user. In another embodiment, information related to the user activity, image animation, and associated data may be stored in the memory of the trusted script 312 loaded in a page of the Web site 306. In yet another embodiment, this information may be stored in the memory of a trusted frame, such as an iFrame embedded in the Web site 306. It will be appreciated that different ways of implementing a local data store configured to store the user activity data and related data may be employed.

Figure 4:
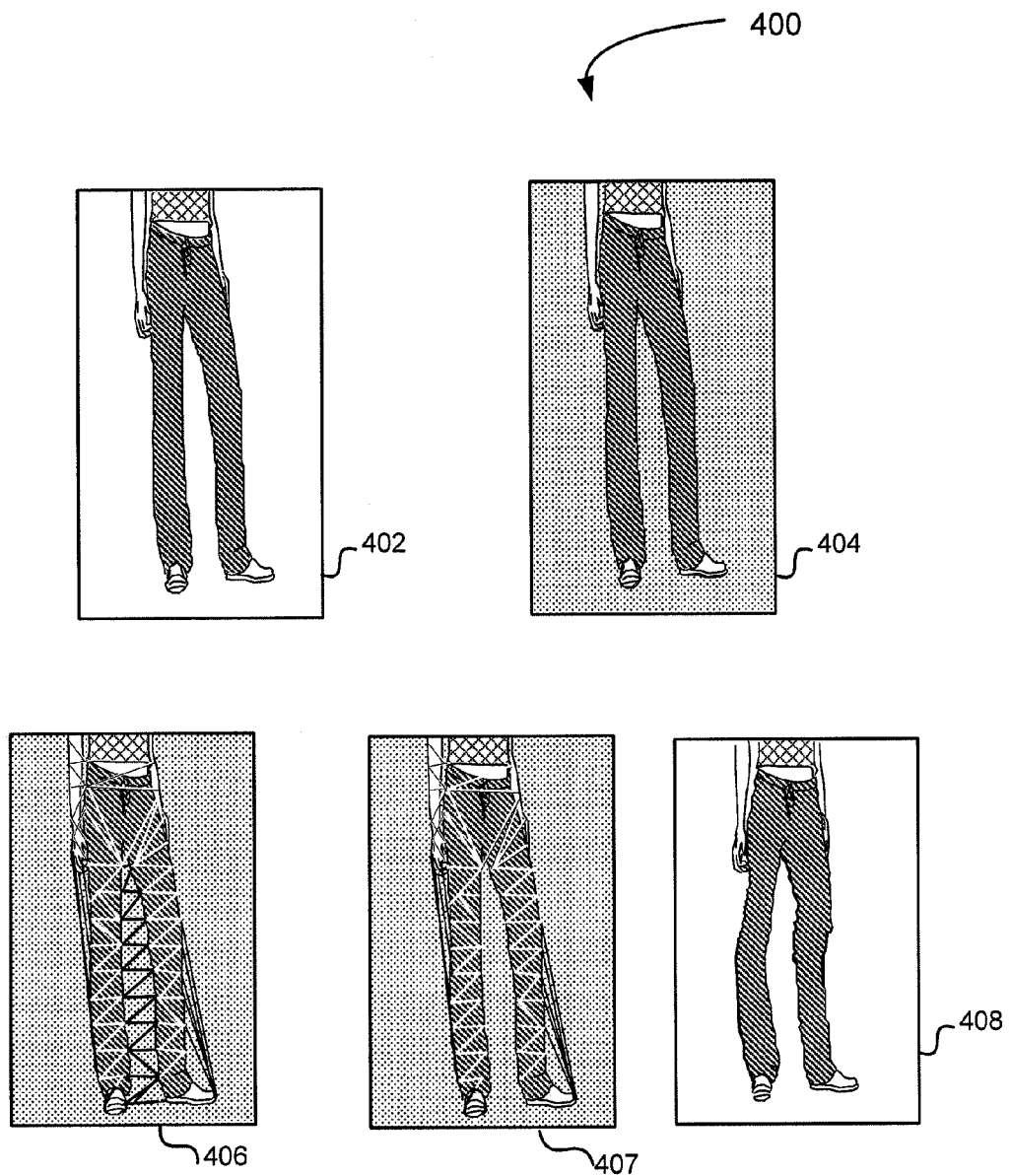
FIG. 4 illustrates an example diagram for enabling animation of content by creating a fabric model in substantially real time in accordance with an embodiment.

FIG. 4 illustrates an example diagram for enabling animation of content by creating a fabric model in substantially real time in accordance with an embodiment. The diagram 400 includes a sequence of transforming an image from element 402, to 404 to 406 to 408 in accordance with the animation technique briefly described above. The original image 402 includes a portion of a figure of a model dressed in a pair of pants shown on a white background. When transforming the image 402 into 404, the pixels of the image comprising white background are separated from the pixels of the image comprising legs in pants by determining the boundaries of the legs in pants. Specifically, as described above, the boundaries may be determined by separating pixels having white color identifiers from pixels having non-white color identifiers. As shown in element 404, the white background is lifted and the points of transition from clear (transparent) elements to non-clear (non-transparent) elements of the image are recorded.

Moving on to the images 406 and 407, the animation-enabling structure, otherwise described herein as a fabric model, is generated. As shown in elements 406-407, the structure may be created using a set of triangulations. However, different structure-creating techniques may be applied to the image shown in elements 406-407. The structure shown in elements 406-407 comprises a set of triangles. However, different segments may be used for the fabric model creation, as will be described below in reference to FIG. 5. As illustrated by element 406, the fabric model may apply to both legs of the image, in which case both legs may animate simultaneously when selected by a user. Element 407 illustrates an instance where both legs are covered by the fabric model, whereas a gap between the two legs is not covered by the fabric model. This allows for animating either leg separately. Finally, element 408 shows a portion of a model figure dressed in pants that is enabled for animation when selected by a user. The animation-enabling techniques will be discussed below in greater detail.

Figure 5:
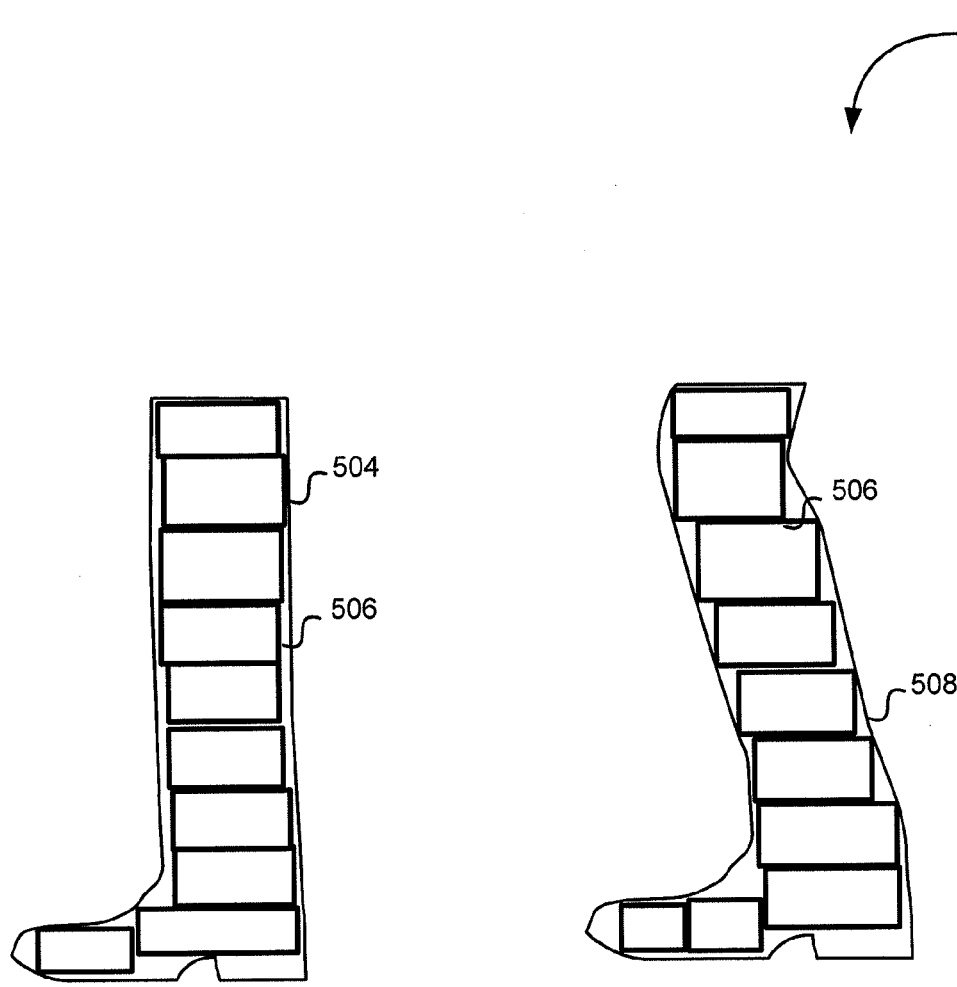
FIG. 5 illustrates an example diagram showing different animation-enabling structures (fabric models) that can be created for an image in substantially real time in accordance with an embodiment.

FIG. 5 illustrates an example diagram 500 showing different animation-enabling structures that can be created for an image. As shown in FIG. 5, an example image represents a portion of a leg dressed in a boot. As shown in elements 504 and 508, the object (a booted leg) may be enabled for animation by "filling" the boundaries of the object 504 with a plurality of squares 506.

As discussed above, various types of segments may be applied for an animation-enabling structure. For example, the segments may take the shape of triangles. As shown, segments 506 comprise a flexible structure that could reflect a movement of a portion of an image, for example, a movement of a boot from a state shown by element 504 to a state shown by element 508. A number of squares 506 and their composition (one square in a row) are shown for illustrative purposes. Generally, the number of structure segments such as squares 506 may be limited by a processing capacity of a computing device executing the structure creating technique. Other types of segments (circles, parallelograms, and the like) may also be used for an animation-enabling structure shown in FIG. 5.

Figure 6:
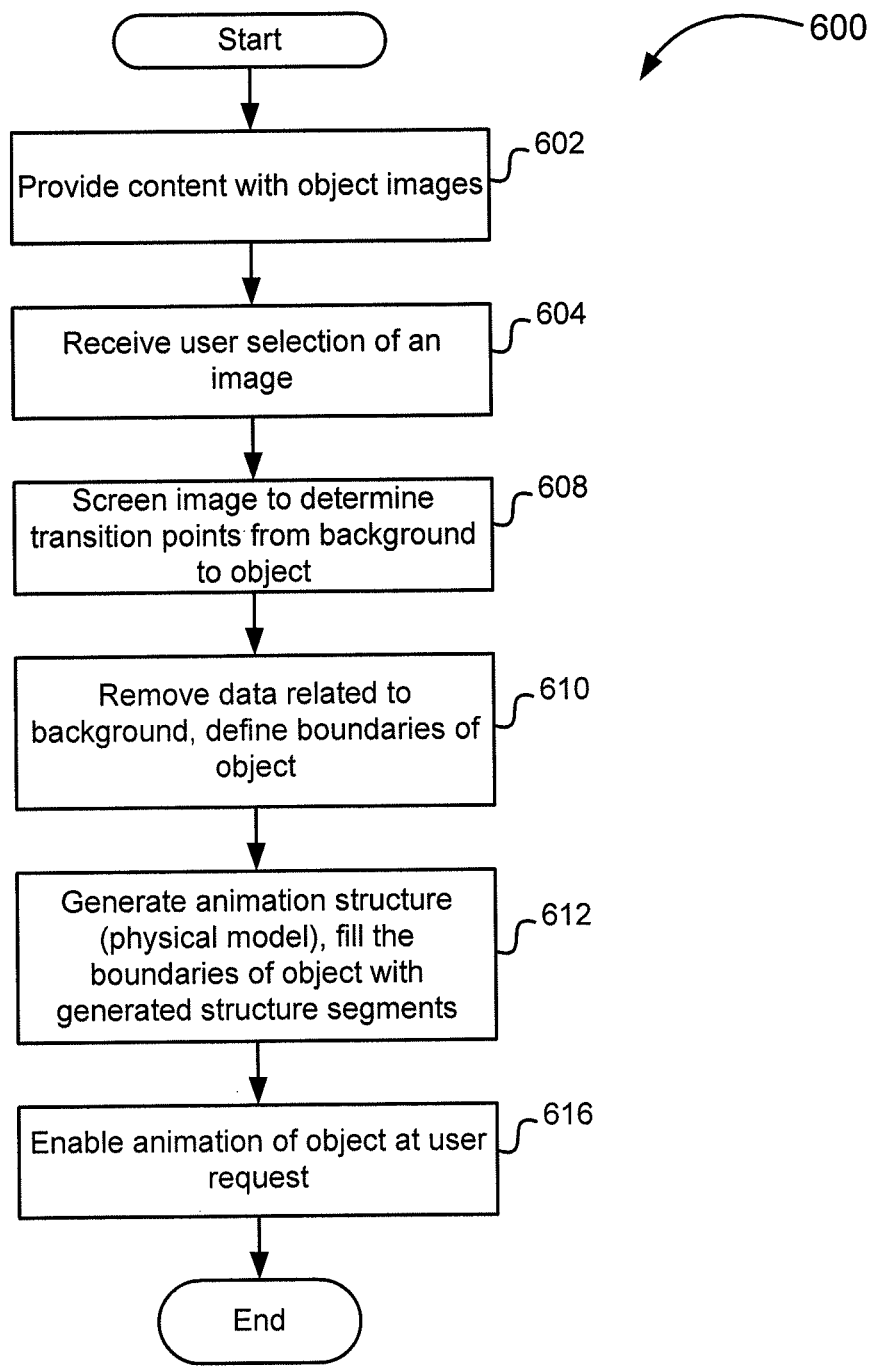
FIG. 6 illustrates a process flow diagram for providing content animation in substantially real time in accordance with an embodiment.

FIG. 6 illustrates a process flow diagram for providing content animation in substantially real time in accordance with an embodiment. The process 600 begins at block 602 where the content with object images is provided to the user. At block 604, a user selection of an object image is received. The user may select an image by clicking on the image, moving a cursor in the area where the image is rendered, or indicate a selection by other known means. In an embodiment, a technique for enabling animation to an image may be applied to one or more (or all) images on the page rendered to the user without having the user select a particular image.

A trusted script embedded in a browser may screen (e.g., scan) the image pixel by pixel in order to determine and record transition points from a background portion of the image (e.g., white or other dominant-color pixels surrounding an object of interest) and a portion of the image corresponding to the object of interest (e.g., non-white or other non-dominant color pixels). At block 608, the object image is screened in order to determine transition points from background to object, for example, by using color characteristics of each screen pixel and determining a transition of non-white to color. At block 610, the data related to background is removed from the image and the boundaries of the object in the image are thus defined. At block 612, an animation structure (i.e., a fabric model) of an object is generated as discussed in reference to FIGS. 4 and 5, and the boundaries of the object and the image are filled with generated structure segments. Thus, at block 616, animation of the object at the user's request is enabled. The process 600 then ends.

Figure 7:
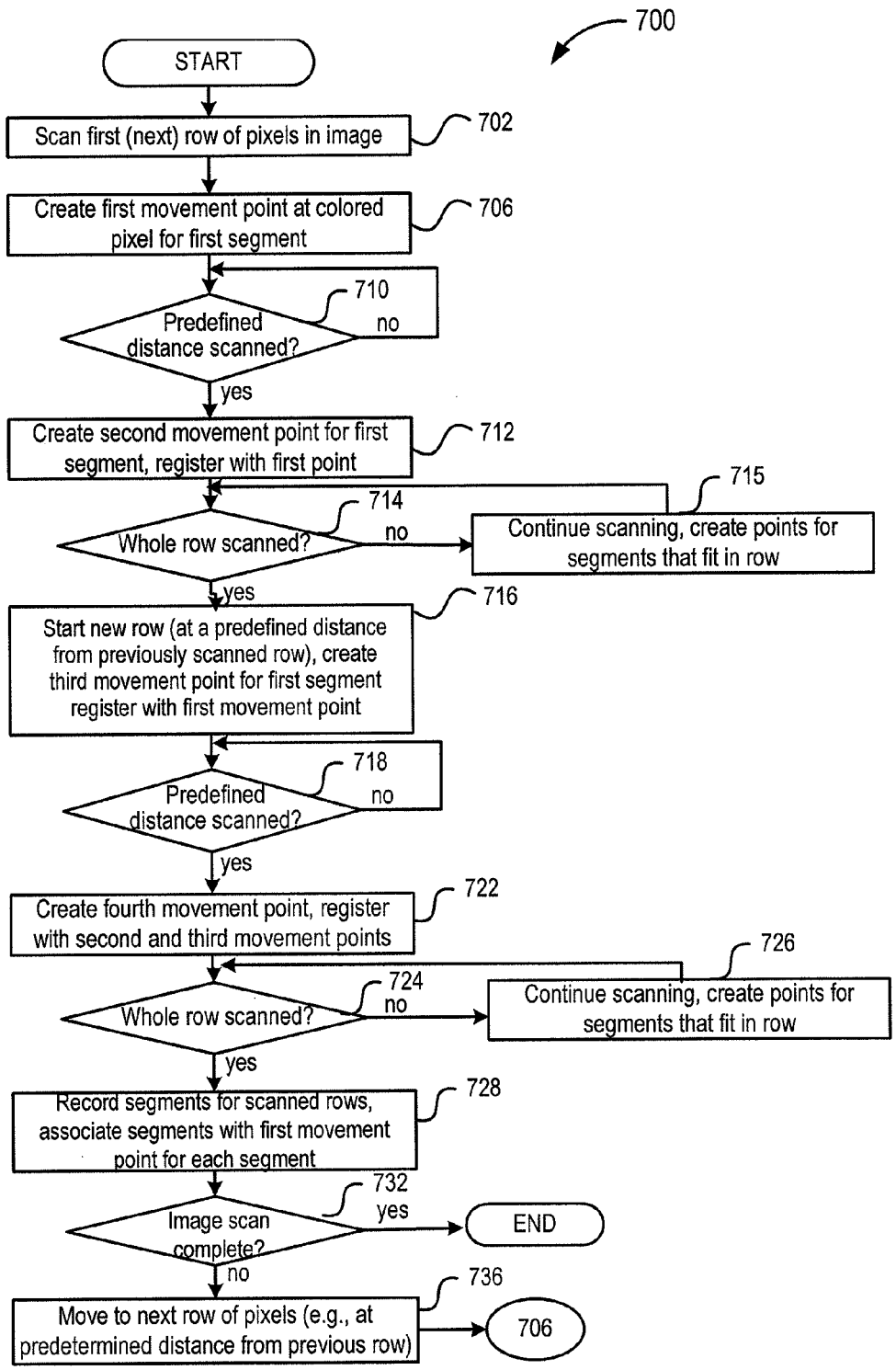
FIG. 7 illustrates a process flow diagram for creating a structure having a plurality of segments that enables content animation of an image in substantially real time in accordance with an embodiment.

FIG. 7 illustrates a process flow diagram for creating a structure having a plurality of segments that enables content animation of an image in substantially real time in accordance with an embodiment. The process 700 describes the process discussed in reference to FIGS. 4 and 5 in greater detail. The process begins at block 702 where a first row of pixels in the image of the object of interest is screened (e.g., scanned). At block 706, a first virtual geometric component (hereinafter a "movement point") is created (for example, for a first segment of the structure, at the leftmost colored pixel in the image). At determination block 710, it is determined whether a predetermined distance (e.g., predefined number of pixels) in a row of pixels is scanned. If the predetermined distance is scanned, at block 712, a second movement point is created and registered with the first point.

At determination point 714, it is determined whether the whole row of pixels has been scanned. If the whole row has not been scanned, the process moves to block 715, where the scanning of the row continues and movement points are created similar to the process described in reference to blocks 706-712. This process continues until the whole row of pixels is scanned. If the whole row of pixels has been scanned, at block 716, a new row of pixels in the image (e.g., a row located at a predefined distance from the previously scanned row) is scanned. A third movement point is created at the leftmost pixel in a row and registered with the first movement point. At determination block 718, it is determined whether the predefined distance in the pixel row is scanned. If the predefined distance (e.g., number of pixels) has been scanned, at block 722, a fourth movement point is created and registered at second and third movement points. At block 724, it is determined whether the whole row of pixels has been scanned. If the whole row. has not been scanned, the process moves to block 726, where the scanning of the row continues and movement points are created similar to the process described in reference to blocks 716-722.

If the whole row of pixels has been scanned, at block 728, the segments (e.g., bounding boxes) of the structure each determined by four created movement points are recorded and associated with a movement point included in the segment, e.g., with the first movement point created for a segment as described above. A segment may comprise a number of different geometric figures, for example, in this embodiment, a parallelogram. At determination block 732, it is determined whether the image scan is complete. If the image scan is not complete, the process returns to block 702, where the scanning of a next row of pixels located, for example, at a predetermined distance from the previous row, begins. In other words, creation of movement point continues for a next set of segments that are to be created. Otherwise, when the whole image has been scanned, the process 700 ends.

Figure 8:
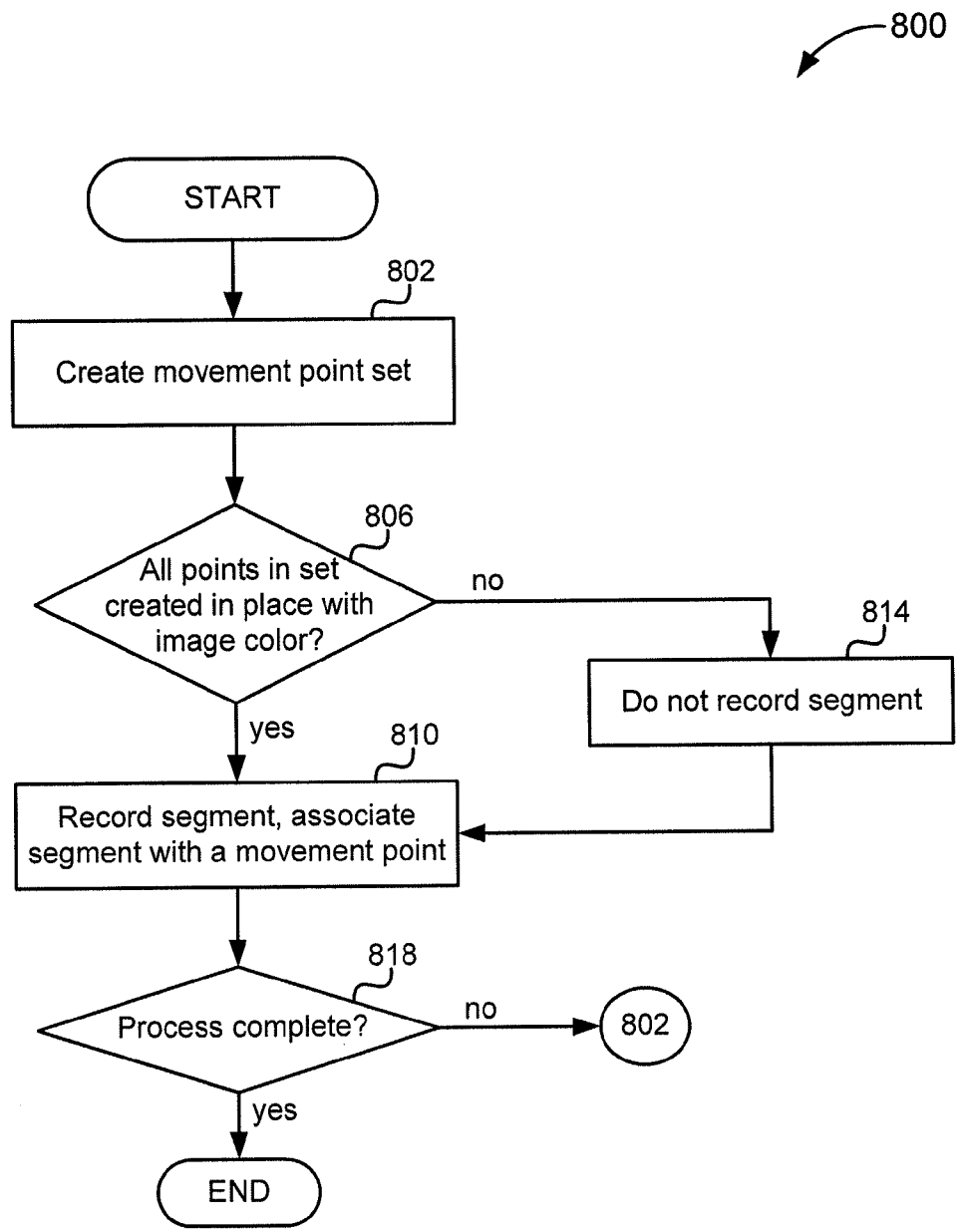
FIG. 8 illustrates a process flow diagram for providing content animation in substantially real time in accordance with another embodiment.

FIG. 8 illustrates a process flow diagram for providing content animation in substantially real time in accordance with another embodiment. The process illustrated in FIG. 8 elaborates on the process described above in reference to FIG. 7. Specifically, the content animation techniques described herein provide for a separation of an object of interest from the rest of the image. For example, if the object of interest is pants, the gap between the trouser legs may be properly determined and separated from the pants due to a color difference associated with pixels comprising the trouser leg and a gap between the trouser legs.

The process 800 begins at block 802 where the movement point set for a segment is created as described above in reference to FIG. 7. At determination block 806, it is determined whether all points in the set are created in place with the image color. In other words, it is determined whether the pixels with which the movement points are created include color information pertaining to the image. If all points in the set are created in place with the image color, at block 810, the segment defined by the points in the set is recorded and the segment is associated with one of the movement points. If at least one point in the set is created outside of the place with the image color, at block 814, it is determined that the segment should not be recorded. At block 818, it is determined whether the process is complete. If the process is not complete, the process returns to block 802 where a new set of movement points for a new segment is created. Otherwise, the process 800 ends.

Figure 9:
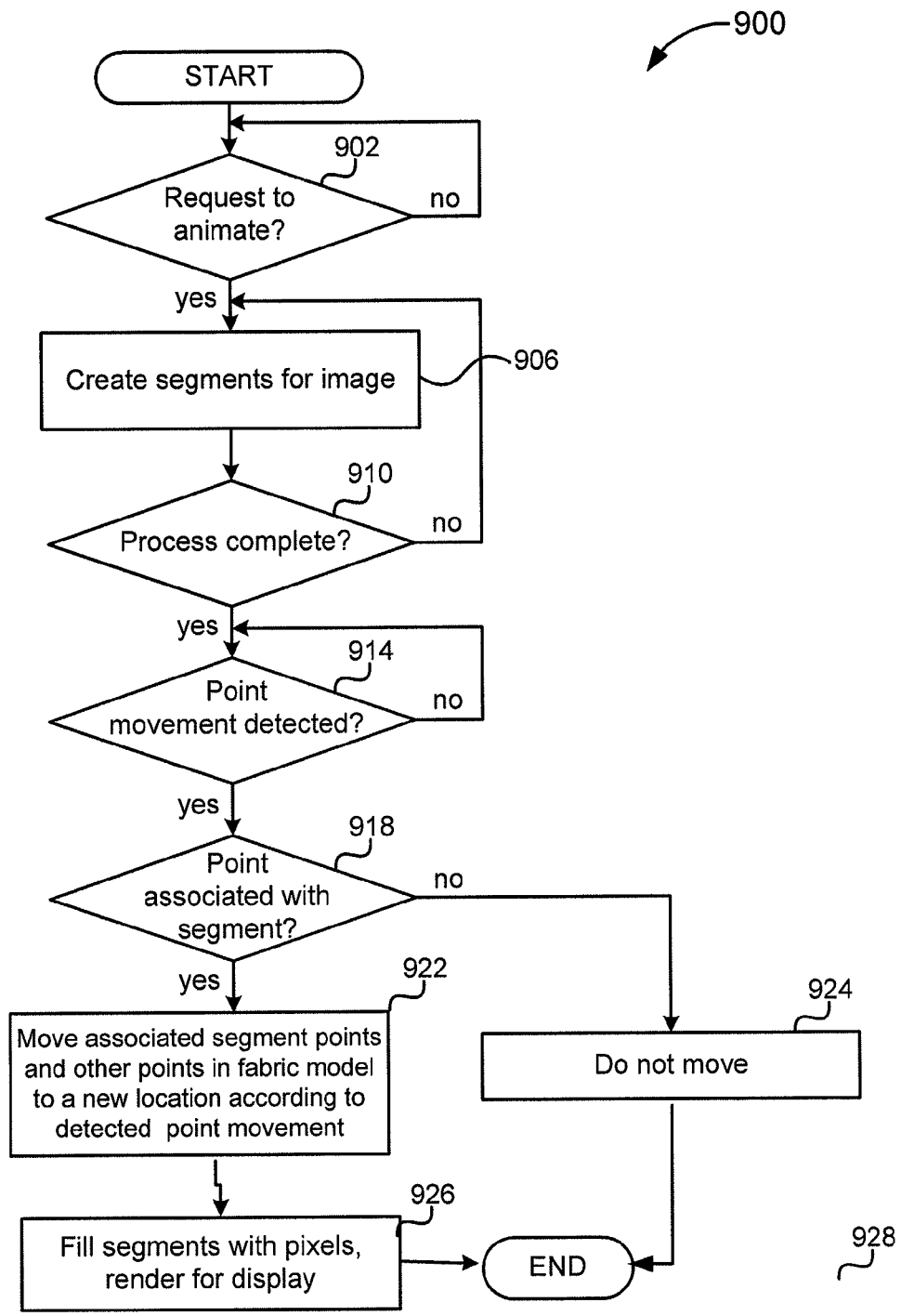
FIG. 9 illustrates a process flow diagram for providing content animation in substantially real time in accordance with yet another embodiment.

FIG. 9 illustrates a process flow diagram for providing content animation in substantially real time in accordance with yet another embodiment. The process describes the details of movement of the created fabric model when the user selects the object in the image (e.g., pulls a part of the object). The process 900 begins at decision block 902 where it is determined whether the request to animate an item viewed by a user is received. As described above, the user may select the image or move a cursor to the image area. Alternatively, the request to animate may not be needed if all or some images in the content are to be animation-enabled. If the request is received, at block 906, the segments for an image are created as described above in reference to FIGS. 7-8. At block 910, it is determined whether the process for segment creation is complete. If the process is complete, at determination block 914, it is determined whether the point movement is detected. In other words, the user may start "dragging" a portion of the image on the screen of his/her computing device. The user may thus access one of the movement points of the created fabric model of the image.

If the point movement is detected, at determination block 918, it is determined whether a point is associated with a segment. If the point whose movement was detected is not associated with a segment, the segment is not moved as specified in block 924. If the point is associated with a segment, the associated segment points and all other movement points in the fabric model are moved according to the point movement detected above. For example, a force (speed) applied to the accessed movement point may be calculated and applied to all remaining movement points in the model. The force applied to all points in the model may be calculated using predefined "slowing" coefficients, for example, a point accessed by the user may be moved with a force (speed) that is higher than a force (speed) that should be applied to the remaining movement points of the fabric model. At block 926, the segments defined by the movement points are filled with pixels and the moved object is rendered to the user. The process 900 then ends.

Figure 10:
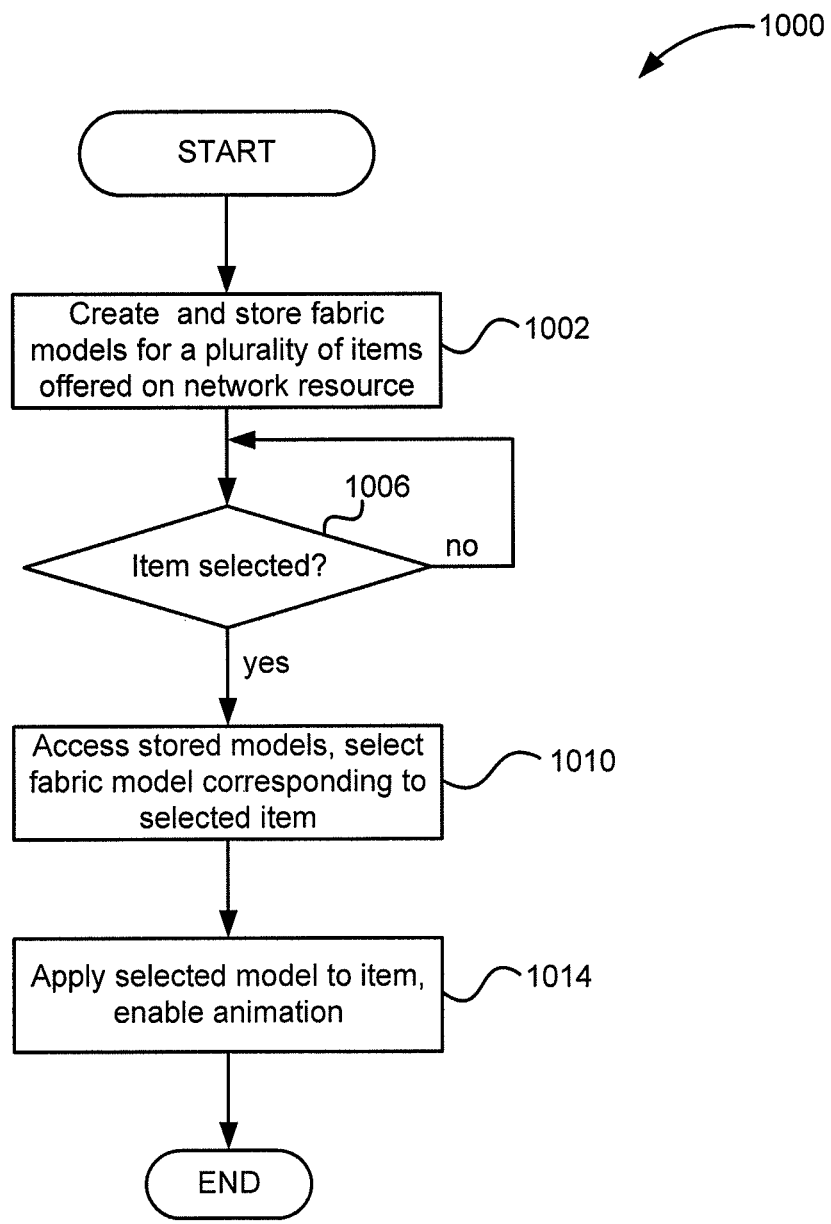
FIG. 10 illustrates a process flow diagram for providing content animation in substantially real time in accordance with yet another embodiment.

FIG. 10 illustrates a process flow diagram for providing content animation in substantially real time in accordance with yet another embodiment. In an embodiment, a content provider may render for viewing and animation a plurality of different objects on a network resource, each object having a particular fabric structure and a corresponding fabric model created beforehand and stored by the provider. For example, objects whose images are viewable by the user may comprise articles of clothing made of different materials, fabric, and the like. The content provider may store information related to the object materials and corresponding fabric models and retrieve this information in substantially real time when an image of the object is selected by a user for animation.

For example, the content provider may store information regarding articles made of cotton, leather, nylon, and corresponding fabric models, which may be applied to the object dynamically upon the user request in order to enable animation of the corresponding image. Different fabric models may be developed in advance and reflect particular properties of a given fabric (material). For example, fabric models having structures comprising a set of triangles may best reflect physical characteristics of cotton, while fabric models having structures comprising a set of circles may best reflect physical characteristics of leather, and so on. In summary, if the content provider knows what the products are made out of, the content provider can apply corresponding fabric models dynamically to the product. Accordingly, a content provider may store a thousand different fabric models, and a relevant fabric model may be applied to a product when a user requests to animate the product (e.g., via the "drag" function of the mouse).

The process 1000 illustrating the above embodiment begins at block 1002 where the fabric models are created and stored for a plurality of items (e.g., articles of clothing) offered by a network resource. At determination block 1006, it is determined whether an item has been selected by a user. If an item is selected by a user, at block 1010, the stored models are accessed and the fabric model corresponding to the item is selected. At block 1014, the selected model is applied to an item, thus enabling animation of an item. The process 1000 then ends.

In an embodiment, the 3D motion capturing capabilities of modern technology may be used for image animation. For example, using Kinect® or similar device, it is possible to create 3D models of physical objects (e.g., articles of clothing) that are to be rendered to a user for viewing on a network resource. Kinect® or similar technologies are based on the range camera technology, which interprets 3D scene information from a continuously-projected infrared structured light. A 3D motion capturing device typically features an RGB camera, depth sensor and multi-array microphone running proprietary software, which provide full-body 3D motion capture, facial recognition and voice recognition capabilities. Using these three devices, for example, allows for generating a 3D model of a moving object at which the devices are pointing.

Accordingly, when, for example, a shipment of clothing is being processed by a content provider in order to render the articles in the shipment to an online user, 3D models of each article may be generated using the above described technology. A computing device controlling the 3D motion capturing devices may observe the movement of fabrics on the article of clothing at which the 3D motion capturing devices are currently pointing and automatically create a fabric model for that article based on the captured movement of the article. Accordingly, a streamlined process of creating the 3D images of objects of interest, making a fabric model, and then delivering the created models along with objects' images to the network resource may be utilized.

Figure 11:
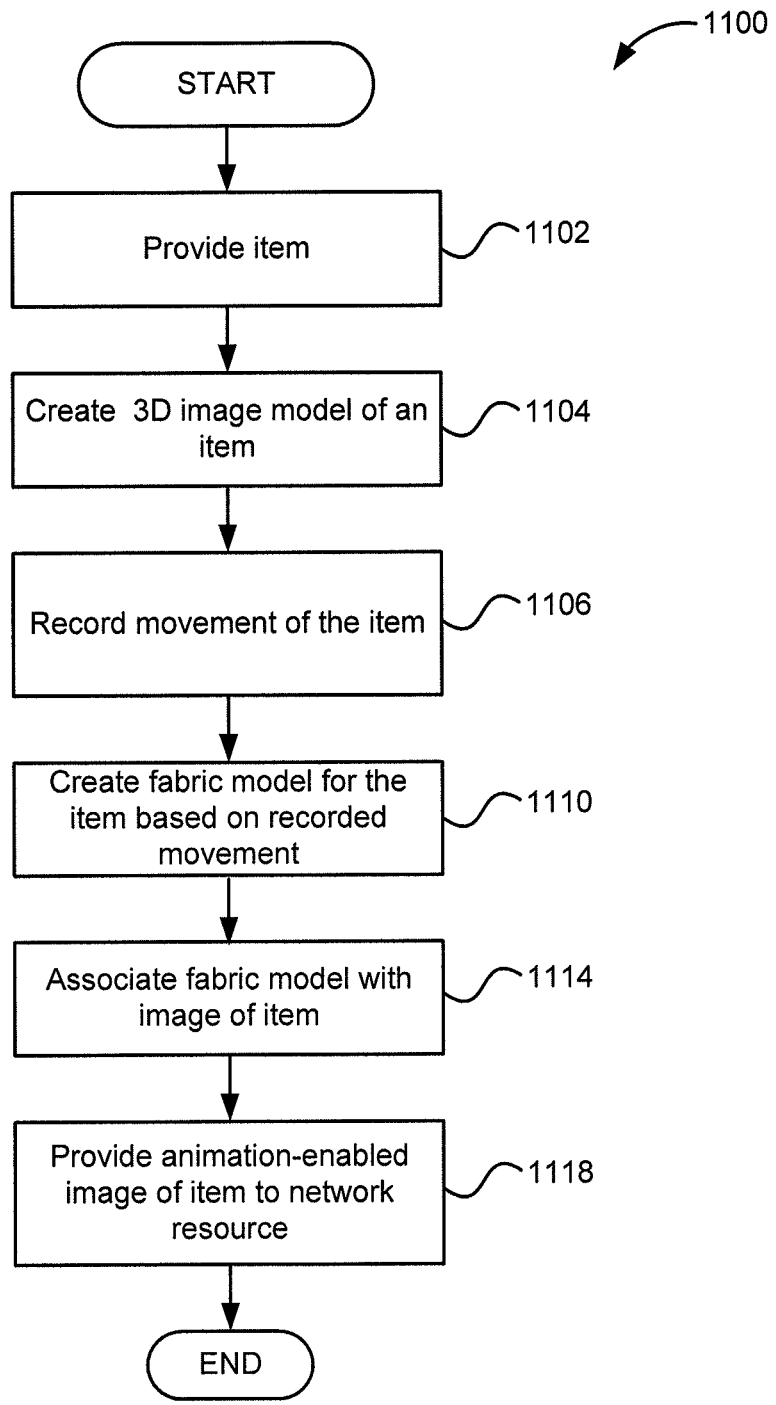
FIG. 11 illustrates a process flow diagram for providing content animation in substantially real time using 3D imaging capabilities in accordance with an embodiment.

FIG. 11 illustrates a process flow diagram for providing content animation in substantially real time using 3D imaging capabilities described above. The process 1100 begins at block 1102, where an item of interest (e.g., an article of clothing) is provided, for example, to or by a content provider. At block 1104, a 3D image model of an item is created using one of the technologies described above. At block 1106, the movements of the item, when being moved, are recorded. Specifically, movement of fabric of an article of clothing may be captured and recorded. At block 1110, the fabric model of the item is created, based on the recorded fabric movement using techniques described herein, e.g., in reference to FIGS. 4-9. At block 1114, the image of the item is provided to the network resource for rendering to a user. The process 1100 then ends.

FIGS. 12-15 illustrate example screenshots of content pages showing search results including images that may be animation-enabled in substantially real time according to embodiments described herein. The screenshots illustrated in FIGS. 12-15 are shown for illustrative purposes only and should not be interpreted as limiting the scope of the various embodiments.

Figure 12:
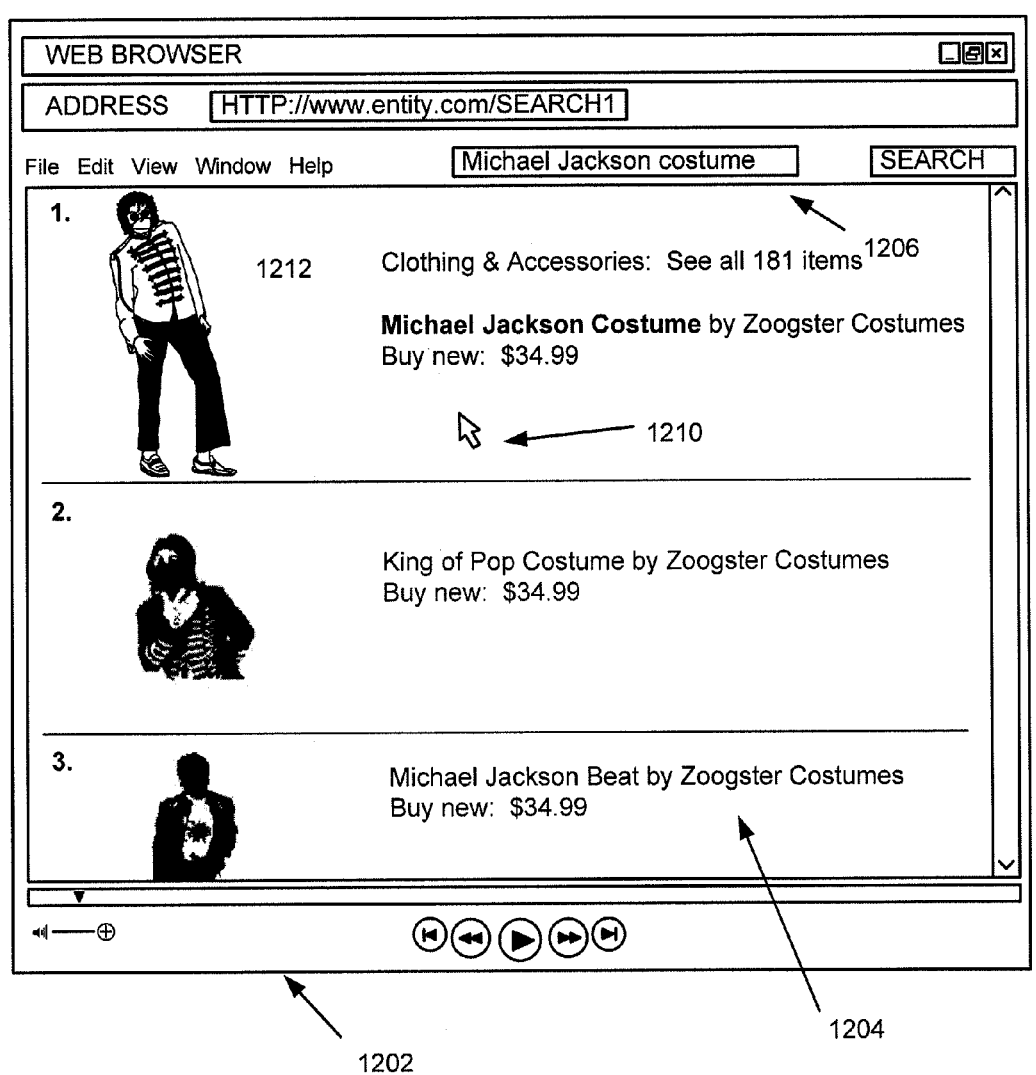
FIG. 12 illustrates an example screenshot of a content page showing search results rendered to a user in accordance with an embodiment.

FIG. 12 illustrates an example screenshot of a content page including images that may be animation-enabled in substantially real time according to a user selection of an image in accordance with an embodiment. The screenshot 1200 includes a Web page 1202 showing search results 1204 returned in response to a user query for "Michael Jackson costume" entered in a search window 1206. The selecting element (e.g., a cursor) 1210 is shown as hovering in the area of a search result 1212 "Michael Jackson Costume by Zoogster Costumes."

Figure 13:
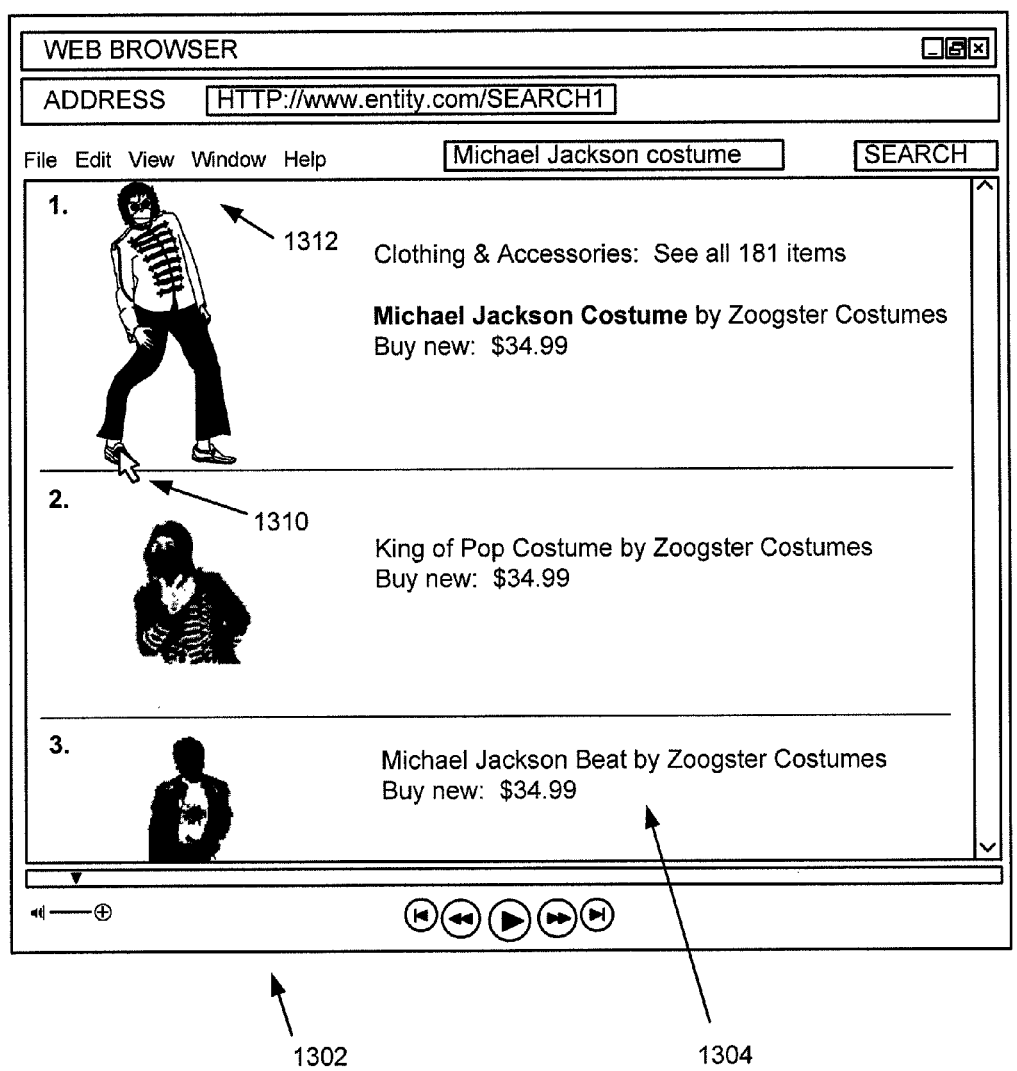
FIG. 13 illustrates an example screenshot of a content page showing search results rendered to a user with a portion of content animated in substantially real time according to a user selection of the portion of content in accordance with an embodiment.

FIG. 13 illustrates another example screenshot of a content page including images that may be animation-enabled in substantially real time according to a user selection of an image in accordance with an embodiment. The screenshot 1300 includes a page 1302 showing same search results 1304 as results 1204 shown in FIG. 12. The cursor 1310 is shown as applied to a lower part of the leg of the costume 1312. When a user "drags" the leg of the costume 1312 with a cursor 1310, the costume becomes animation-enabled as described above and the leg dragged by the cursor begins moving following the "dragging" force applied by the cursor.

Figure 14:
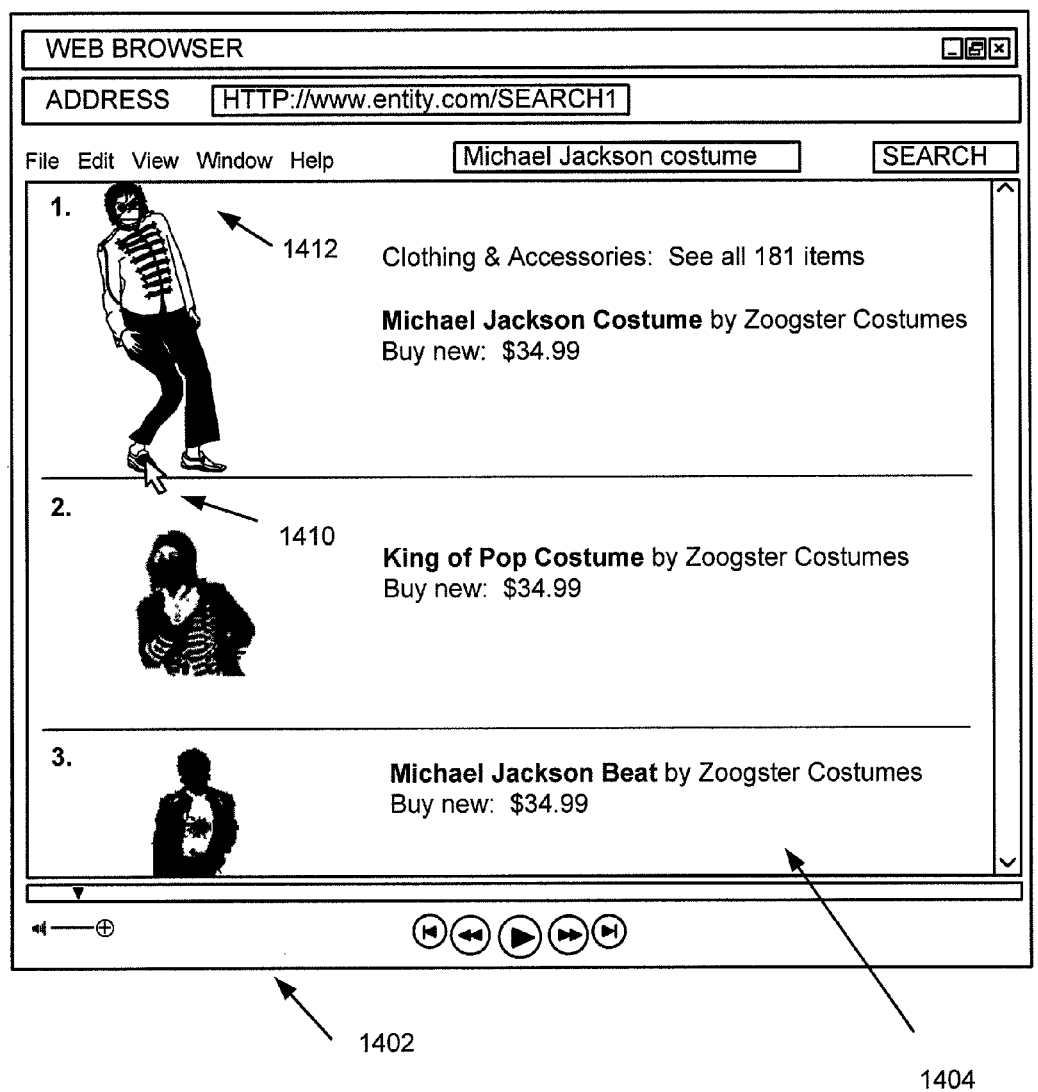
FIG. 14 illustrates another example screenshot of a content page showing search results rendered to a user with a portion of content animated in substantially real time according to a user selection of the portion of content in accordance with an embodiment.

FIG. 14 illustrates an example screenshot of a content page modified in substantially real time according to a recorded user activity in accordance with an embodiment. FIG. 14 illustrates another example screenshot of a content page including images that may be animation-enabled in substantially real time according to a user selection of an image in accordance with an embodiment. The screenshot 1400 includes a page 1402 showing the same search results 1404 as results 1204 and 1304 shown in FIGS. 12 and 13. The cursor 1410 is shown as applied to a lower part of the leg of the costume 1412 in a different manner as the one shown in FIG. 13. Specifically, a user "drags" the leg of the costume 1412 with a cursor 1410 in a direction that is different from the one shown in FIG. 13. Accordingly, the costume moves, following the "dragging" force applied by the cursor in a different direction.

Figure 15:
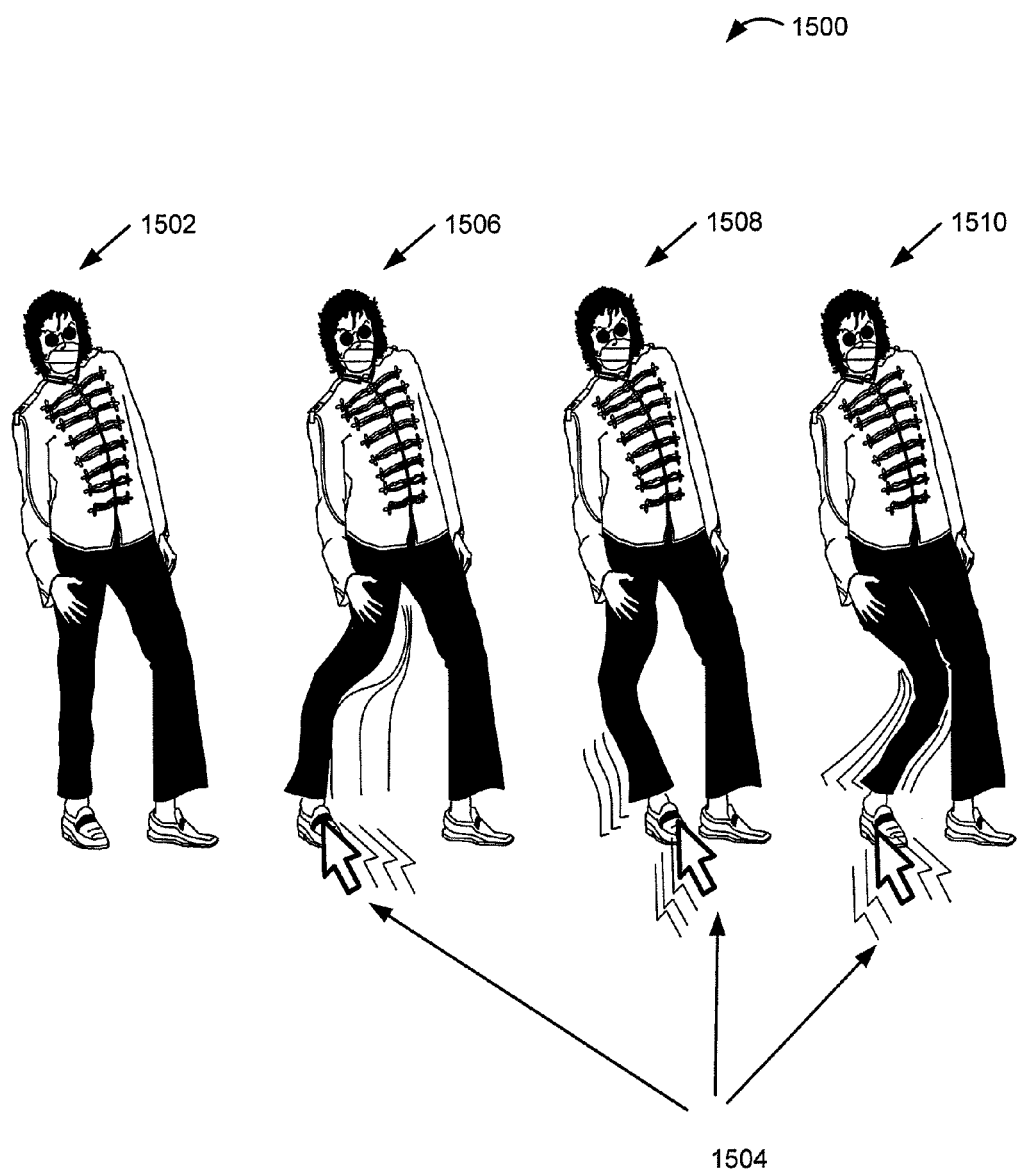
FIG. 15 illustrates an example screenshot of a content page showing a sequence of images animated in real time according to a user selection in accordance with an embodiment.

FIG. 15 illustrates an example sequence of the movements produced by dragging the Michael Jackson costume 1502 with a cursor 1504 as shown in the sequence of FIGS. 12-14. As shown in FIG. 15, the user first moves the right leg of the costume 1502 to the right (1506), then to the left (1506), and then wiggles it from left to right and from right to left (1510). The leg of the costume and the costume itself become animated and follow the movement of the cursor 1504, thus demonstrating the properties of the fabric of the costume when the costume moves.

Different applications of the real-time animation techniques may be contemplated. For example, in an embodiment, different portions of the objects of interest may be separated, similar to the embodiment described above in reference to FIG. 8. For example, when an object of interest is an image of a person (e.g., a model) wearing a particular article of clothing, for example, a shirt, the pixels comprising a shirt may be separated from the pixels comprising a part of the body (e.g., a hand) by, for example, color identifiers. In that case, a part of the body that is not a portion of the fabric may be moved out of the way if, for example, a hand of the body obscures a portion of the object of interest.

In another embodiment, the described techniques may be used to show a collection of clothes on an avatar representing a fashion model of a user himself or herself. For example, an avatar's movements, when animated, may be recorded and stored in a repository. Then, an image of an article of clothing enabled for animation as described above may be overlaid on the avatar (e.g., an article may be "dragged and dropped" on the avatar) and the avatar may "show" the article of clothing in substantially real time. In one embodiment, a video of an avatar's movements may be pre-recorded and stored, so that when an article of clothing is virtually "put on" the avatar as described above, the avatar's movements do not have to be recomputed. Alternatively, the avatar movements may be executed on the browser in substantially real time.

In yet another embodiment, images of objects of interest, with their background dominant colors removed, may be stacked (e.g., overlaid) upon each other and dragged out of the stack one by one. Furthermore, the images (e.g., of articles of clothing) may "animate" simultaneously and independently of each other when a stack is selected by the user.

As discussed above, the various embodiments can be implemented in a wide variety of operating environments, which in some cases can include one or more client computers, computing devices, or processing devices which can be used to operate any of a number of applications. Client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response to requests from client devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation, those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices, such as random access memory ("RAM") or read-only memory ("ROM"), as well as removable media devices, memory cards, flash cards, and the like.

Such devices also can include a computer-readable storage media reader, a communications device (e.g., a modem, a network card (wireless or wired), an infrared communication device), and working memory as described above. The computer-readable storage media reader can be connected with, or configured to receive, a computer-readable storage medium, representing remote, local, fixed, and/or removable storage devices, as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the present disclosure as set forth in the claims.

What is claimed is:

1. A computer-implemented method for enabling animation of content, comprising:
    under the control of one or more computer systems configured with executable instructions,
    receiving user selection of an image included in content rendered to the user, the image including an object and a background;
    determining a boundary of the object in the image;
    separating the object in the image from the background based at least in part on the determined boundary;
    designating a plurality of virtual geometric components within the boundary of the object;
    moving at least one of the plurality of virtual geometric components within the boundary of the object, the moving causing animated motion of the object;
    the movement of the at least one of the plurality of virtual geometric components being constrained with respect to at least one adjacent geometric component; and
    in response to a user selection of at least a portion of the image corresponding to the object, enabling a movement of the object within the image according to the animation structure,
    wherein the portion of the image selected by the user includes at least one virtual geometric component.

2. A computer-implemented method for providing animation of content, comprising:
    under the control of one or more computer systems configured with executable instructions,
    providing content for display including at least one image;
    detecting an interaction of a user with respect to the at least one image;
    determining a boundary within the image comprising a contour of an object represented in the at least one image;
    moving at least one of a plurality of virtual geometric components within the boundary of the object, the moving causing animated motion of the object, the animation structure including a plurality of segments;
    each segment of the plurality of segments being defined by a subset of the virtual geometric components within the boundary of the object;
    applying a set of movement constraints to the object within the determined boundary; and
    enabling animation of a portion of the at least one image corresponding to the object in the displayed content based at least in part upon the applied movement constraints, the enabling including applying the generated animation structure to the object.

3. The computer-implemented method of claim 2, wherein the animation occurs in response to a user selecting a portion of the object and moving the object within the selected image.

4. The computer-implemented method of claim 2, wherein generating an animation structure for the object including a plurality of segments includes:
    scanning each row of pixels comprising the object;
    creating at least two virtual geometric components in each row;
    defining each segment with at least four virtual geometric components, wherein each two of the four virtual geometric components are located in a same row; and
    associating at least one of the four virtual geometric components with the segment.

5. The computer-implemented method of claim 4, further comprising:
    associating the generated structure with the object; and
    storing information defining the generated structure and the association of the structure with the object.

6. The computer-implemented method of claim 2, wherein determining a boundary within the image includes:
    determining transition points from data elements comprising a background of the image to data elements comprising the object within the image; and
    separating the object from the background based on the determined transition points.

7. A computer-implemented method for providing personalized content, comprising:
    under the control of one or more computer systems configured with executable instructions,
    receiving a selection of an item;
    generating an image model of the item, the image model including a boundary of the item;
    capturing information defining a movement of the item using the created image model;
    designating a plurality of virtual geometric components within the boundary of the item;
    moving at least one of the plurality of virtual geometric components within the boundary of the item, the moving causing animated motion of the item;
    the movement of the at least one of the plurality of virtual geometric components being constrained with respect to at least one adjacent geometric component;
    capturing an image of the item to be rendered on a network resource;
    associating the created animation structure with the captured image of the item; and
    providing the image and the associated animation structure to the network resource.

8. The computer-implemented method of claim 7, wherein generating the image model of the item includes capturing motions of the item using a 3D motion capturing technology.

9. The computer-implemented method of claim 8, wherein the 3D motion capturing technology includes a range camera technology.

10. The computer-implemented method of claim 7, wherein the item is selected from a plurality of articles of clothing offered for sale on the network resource.

11. A computer system for providing personalized content, the system comprising:
    a processor; and
    a memory having computer-executable instructions that, when executed on the processor, cause the processor to:
    provide content for display including at least one image;

detect an interaction of a user with respect to the at least one image;
determine a boundary within the image comprising a contour of an object represented in the at least one image;
move at least one of a plurality of virtual geometric components within the boundary of the object, the moving causing animated motion of the object, the animation structure including a plurality of segments;
each segment of the plurality of segments being defined by a subset of the virtual geometric components within the boundary of the object;
apply a set of movement constraints to the object within the determined boundary; and
enable animation of a portion of the at least one image corresponding to the object in the displayed content based at least in part upon the applied movement constraints, the enabling including applying the generated animation structure to the object.

12. The computer system of claim 11, wherein the computer-executable instructions that cause the processor to generate an animation structure for the object including a plurality of segments further cause the processor to:
scan each row of pixels comprising the object;
create at least two virtual geometric components in each row;
define each segment with at least four virtual geometric components, wherein each two of the four virtual geometric components are located in a same row; and
associate at least one of the four virtual geometric components with the segment.

13. The computer system of claim 11, wherein the animation occurs in response to a user selecting a portion of the object and moving the object within the selected image.

14. A non-transitory computer-readable storage medium having computer-executable instructions for providing personalized content stored thereon that, when executed by a computer, cause the computer to:
provide content for display including at least one image;
detect an interaction of a user with respect to the at least one image;
determine a boundary within the image comprising a contour of an object represented in the at least one image;
move at least one of the plurality of virtual geometric components within the boundary of the object, the moving causing animated motion of the object, the animation structure including a plurality of segments;
each segment of the plurality of segments being defined by a subset of the virtual geometric components within the boundary of the object;
apply a set of movement constraints to the object within the determined boundary; and
enable animation of a portion of the at least one image corresponding to the object in the displayed content based at least in part upon the applied movement constraints, the enabling including applying the generated animation structure to the object.

15. The computer-readable storage medium of claim 14, wherein the computer-executable instructions that cause the computer to determine a boundary within the image further cause the computer to:
determine transition points from data elements comprising a background of the image to data elements comprising the object within the image; and
separate the object from the background based on the determined transition points.

16. The computer-readable storage medium of claim 14, wherein the computer-executable instructions that cause the computer to generate an animation structure for the object including a plurality of segments further cause the computer to:
scan each row of pixels comprising the object;
create at least two virtual geometric components in each row;
define each segment with at least four virtual geometric components, wherein each two of the four virtual geometric components are located in a same row; and
associate at least one of the four virtual geometric components with the segment.

17. The computer-readable storage medium of claim 14, wherein the animation occurs in response to a user selecting a portion of the object and moving the object within the selected image.

* * * * *